UNITED STATES PATENT OFFICE.

HERMANN VIETH, OF LUDWIGSHAFEN-ON-THE-RHINE, GERMANY, ASSIGNOR TO KNOLL & CO., OF LUDWIGSHAFEN, GERMANY, A FIRM.

INSIPID SANDALWOOD-OIL PREPARATIONS.

No. 862,858.    Specification of Letters Patent.    Patented Aug. 6, 1907.

Application filed November 8, 1905. Serial No. 286,441.

*To all whom it may concern:*

Be it known that I, HERMANN VIETH, Ph.D., a citizen of the Empire of Germany, residing in Ludwigshafen-on-the-Rhine, in said Empire of Germany, have invented certain new and useful Improvements in Insipid Sandalwood-Oil Preparations and Processes of Making the Same, of which the following is a specification.

The sandalwood oil as obtained from India and Australia, consists mainly of a mixture of two isomere terpene alcohols, namely, santalol A (and santalol B), which have almost the same properties and which, when esterificized, are very similar to each other. The specific gravity of pure sandalwood oil is 0.98.

The sandalwood oil and the preparations manufactured therefrom, such as, for instance, the pure santalol, are largely used in the treatment of the diseases of the bladder, but they are objectionable on account of their disagreeable taste and the irritating effect which they exert on the stomach and the other internal organs. The already known acetyl derivatives, and even in a higher degree the acid phthalic acidester of the santalol, are open to the same objection. I have discovered that these disadvantages of the sandalwood oil and its preparations can be removed by converting them into the neutral esters of the monobasic aromatic acids, such as the benzoic acid, salicylic acid, cinnamic acid, etc. These esters differ in their pure state from the acetyl compounds by having but a slightly oily flavor and no acrid taste whatever, so that they can be taken even by the most sensitive patients, in the plain liquid form, and that it is not necessary to dispense the so-altered oil in the form of capsules, like the ordinary sandalwood oil or its preparations. There is further no irritating effect on the internal organs. The absence of these disadvantages is chiefly due to the resistance of the esters of higher molecular binding against decomposition in the saliva or juice of the stomach, as is the case with acetylesters of the sandalwood oil. The said esters are manufactured according to the ordinary methods of acidulation, as, for instance, by the action of anhydrids, chlorid, and esters of the acids.

*Examples:*

(*1*). *Preparation of the Benzoic Acidester.*

(*a.*) *By means of benzoic acid anhydrid.* 1 kilogram of sandalwood oil is heated during 4 hours with 1 kilogram (or a small surplus quantity of benzoic acid anhydrid) at a temperature of 110° C. The formed benzoic acid is removed by shaking out with a caustic soda solution. The remaining benzoylsantalol is purified by distillation at a diminished pressure (*in vacuo*). The main bulk of the preparation is distilled at a temperature of 236°—238° C. and a pressure of 15 mm. Instead of this distillation, it is still better to treat the preparation with superheated steam at ordinary or diminished pressure whereby the components of the sandalwood oil, which are not benzoylated, are distilled over, while the purified benzoylsantalol remains.

(*b.*) *By means of benzoylchlorid.* 1 kilogram of sandalwood oil is dissolved in 5 liters of chloroform under addition of 1 kilogram of water-freed pyridin. To this solution 1 kilogram of benzoylchlorid is slowly added, whereby an increase of temperature will be noticed. The liquid is purified by shaking it thoroughly with water, hydrochloric acid and caustic soda solution, the chloroform driven off and the operation proceeded with as above described. The benzoylated sandalwood oil has a specific gravity of 1.047 at 15° C., and splits off 35% of benzoic acid, when decomposed by means of an alcoholic solution of caustic soda.

(*2*). *Preparation of the Salicylic Acidester.*

1 kilogram of sandalwood oil or pure santalol is heated with the same quantity of salol by addition of a small quantity of caustic soda at a temperature of 100°—200° C., if possible under diminished pressure, until the separation of the phenol is effected. From the residue pure salicylsantalol is obtained in analogy to the process described in Example No. 1. The product yielded is quantitative. From 10 grams of this preparation 3.85 grams of salicylic acid (calculated: 4.0 grams) and 6.0 grams of santalol are obtained, after decomposing with an alcoholic solution of caustic soda. Salicylsantalol boils and is partly decomposed at a temperature of 250°—260° C. and a pressure of 20 mm. The specific gravity is 1.07.

In the same way as described in the foregoing examples, other analogous acidesters, chlorids and anhydrids may be used for acidulation, as, for instance, the chlorid or the phenylester of cinnamic acid, cresylic acid, etc., whereby products of the sandalwood oil are obtained which answer the same purpose.

Having thus described my invention, I claim as new and desire to secure by Letters Patent:

1. The process herein described of producing insipid sandalwood oil preparations, which consists in treating sandalwood oil with the neutral acidesters of monobasic aromatic acids.

2. As an article of manufacture, insipid sandalwood oil preparations, obtained by treating sandalwood oil with the neutral acidesters of monobasic aromatic acids which form thick yellowish oils of a specific gravity above one, and which are split, when heated with an alcoholic solution of caustic soda lye, into santalol and the corresponding acids employed.

In testimony, that I claim the foregoing as my invention, I have signed my name in presence of two subscribing witnesses.

HERMANN VIETH.

Witnesses:
F. GLAS,
JOS. H. LEUTE.